July 15, 1924.
C. F. RANDOLPH
1,501,723
LATHE CONTROLLING MECHANISM
Filed Aug. 25, 1920   2 Sheets-Sheet 1
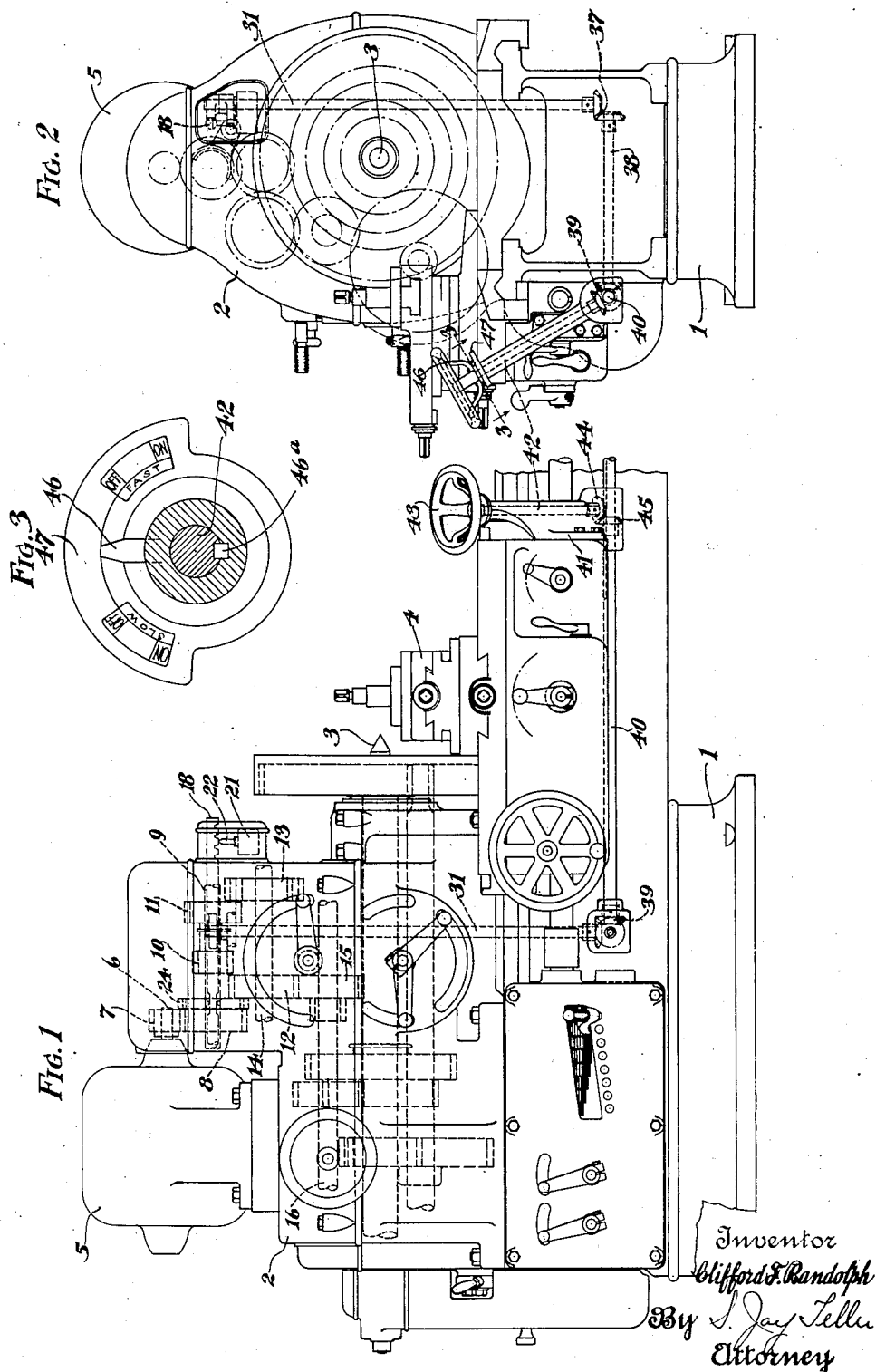

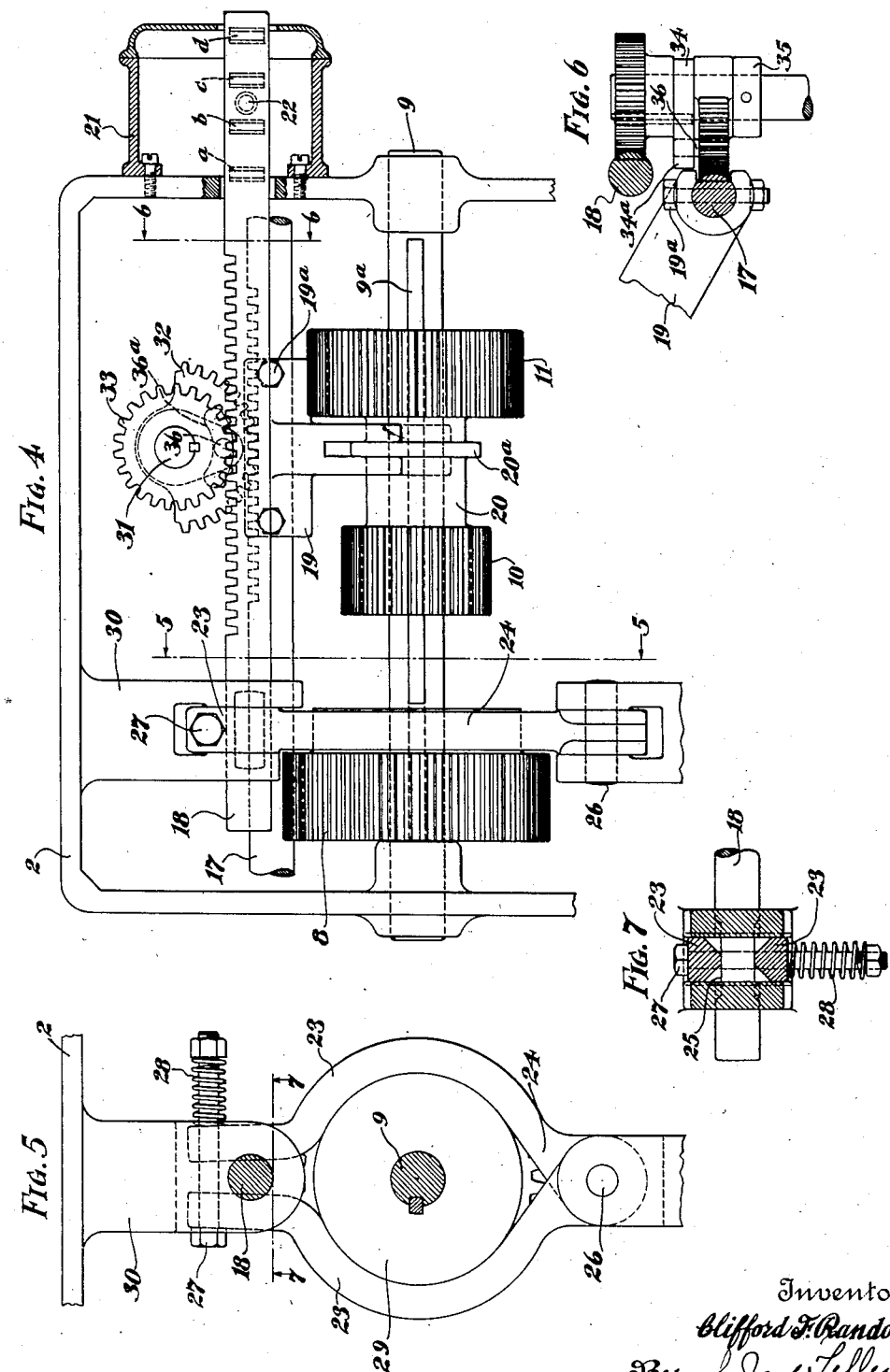

Patented July 15, 1924.

1,501,723

UNITED STATES PATENT OFFICE.

CLIFFORD F. RANDOLPH, OF PLAINFIELD, NEW JERSEY, ASSIGNOR TO NILES-BEMENT-POND COMPANY, OF NEW YORK, N. Y., A CORPORATION OF NEW JERSEY.

LATHE-CONTROLLING MECHANISM.

Application filed August 25, 1920. Serial No. 406,014.

*To all whom it may concern:*

Be it known that I, CLIFFORD F. RANDOLPH, a citizen of the United States, residing at Plainfield, in the county of Union and State of New Jersey, have invented certain new and useful Improvements in Lathe-Controlling Mechanisms, of which the following is a specification.

This invention relates to a lathe and particularly to an improved mechanism for controlling the rotation of the lathe spindle and to means always at the hand of the operator for operating such mechanism. The principal object of the invention is to provide a mechanism of the above type wherein the operation of the lathe spindle may be definitely and accurately controlled by the operator from means preferably on the lathe carriage, such operation including the starting and stopping of the spindle and the speed of rotation thereof. More specifically, the object of the invention resides in providing a lathe spindle controlling device adapted to be operated by a single hand means placed within easy reach of the operator and adapted by the same movement to operate the power control means, shown herein as a push button switch in an electric control box, a frictional machine brake and a change speed mechanism. As will hereinafter be more fully described, movement of the controlling means from the neutral position in one direction is adapted to release the brake, engage the speed change mechanism at low speed and apply the electric current to start the machine, and movement thereof from the neutral position in the opposite direction is adapted to perform the same operation but with the speed change gearing engaged at high speed. Other and more specific objects of the invention will appear as the description proceeds.

The drawings illustrate and the specification describes one embodiment of the invention. However, it should be understood that the invention in its broad aspect is capable of other embodiments and may be used in machines other than lathes. Reference to the claims should be made to determine the scope of the invention.

Referring to the drawings:

Figure 1 is a front view of the major portion of a lathe having the present invention embodied therein.

Fig. 2 is an end view thereof looking at the right end of Fig. 1.

Fig. 3 is a detail sectional view taken on the line 3—3 of Fig. 2 and illustrating the controller dial.

Fig. 4 is an enlarged detail plan view of the principal elements of the controlling mechanism within the headstock of the lathe, the view being taken with the headstock cover plate and the motor shaft and its gears removed.

Fig. 5 is a cross section taken on the line 5—5 of Fig. 4 looking in the direction of the arrows and showing the brake mechanism and its operating parts.

Fig. 6 is a detail view of a part of the controlling mechanism taken on the line 6—6 of Fig. 4.

Fig. 7 is a cross section on the line 7—7 of Fig. 5 taken in the direction of the arrows and showing the relation of the brake arms to the brake rod.

Referring more specifically to the drawings, wherein a lathe embodying the present invention is shown, 1 represents the lathe bed, 2 the headstock thereof, 3 the lathe spindle, 4 the movable tool carriage, and 5 the electric drive motor. The motor shaft 6 has a pinion 7 thereon meshing with a gear 8 on a countershaft 9. Two preferably integral gears 10 and 11 are splined at 9ª for sliding movement on the countershaft 9 and are adapted to be meshed with the gears 12 and 13 respectively on the shaft 14. The gear 12 is in mesh with a gear 15 on a shaft 16 from which power is transmitted to the lathe spindle 3 through the system of gearing illustrated in Figs. 1 and 2. The carriage 4 is operated from the motor and the usual system of gearing, including a portion of the gearing just described, extending into the speed change gear box at the left of Fig. 1 and thence to the carriage. Since this gearing specifically is not a part of the present invention, further description thereof will be omitted.

The controlling mechanism, as above stated, comprises a speed change mechanism, a power control means and a brake. I preferably operate the speed change mechanism from one means, as the sliding rod 17 (Figs. 4 and 6), and the power control means and the brake from another means, as the sliding rod 18. A gear shifting yoke 19 is secured to the rod 17 by means of bolts 19ª and a forked portion of the yoke engages an annular flange 20ª on the hub 20 of the gears 10 and 11 whereby sliding of the rod 17 shifts the gears 10 and 11 into and out of mesh with their companion gears 12 and 13 respectively.

As seen in Figs. 1 and 4, I provide an electric control box at 21 for controlling the current delivered to the drive motor 5. As one simple means of control, I illustrate a push button 22 extending from the box and normally held in this extended position by a spring within the box, the electric control switch within the box thereby being normally held in a closed position. The electric contacts within the box are so arranged that inward movement of the control button will operate to open the switch and stop the motor. This button is adapted to engage the rod 18 and in certain positions of such rod the button is adapted to drop into one of a plurality of notches $a$, $b$, $c$ or $d$ in the rod, the switch in such positions of the button being closed. The arms 23 of a friction brake 24 are also adapted to engage the rod 18 and in a certain position of such rod are adapted to drop into notches 25. The brake arms are pivoted to the machine frame at 26 and a bolt 27 and spring 28 thereon are adapted to normally hold the brake arms in frictional contact with the brake drum 29 preferably integral with the gear 8. A forked bracket 30 on the machine frame prevents lateral movement of the brake arms.

I preferably operate both rods 17 and 18 from a single vertical shaft 31 by means of the rack and pinion arrangement shown in Figs. 2, 4 and 6. A toothed sector 32 and a pinion 33 both mounted on the shaft 31 engage rack teeth on the rods 17 and 18 respectively. The pinion 33 is keyed to shaft 31 and the sector 32 is mounted between collars 34 and 35 and has a limited rotary movement on the shaft. The collar 34 is keyed to the shaft and has an arm 34ª provided with a pin 36 therein engaging in an arcuate slot 36ª in the sector 32. It will now be seen that rotative movement of the shaft 31 always rotates the pinion 33 and slides the rod 18 and that rotation of the shaft moves the sector 32 only when the pin 36 is at either end of its travel along the slot 36ª. Movement of the shaft 31 in one direction or the other is adapted to control the entire mechanism above described.

The shaft 31 extends downward within the lathe housing and through bevel gears 37 has operative connection with a short transverse shaft 38 which in like manner through bevel gears 39 has operative connection with a shaft 40 extending along the lower portion of the front of the lathe bed. A bracket 41 on the tool carriage supports a short shaft 42 having an operating wheel 43 at the top thereof. A bevel gear 44 mounted on the lower end of the shaft 42 engages a like gear 45 mounted in the bracket 41 and splined to the shaft 40 for longitudinal movement therealong. By this construction and arrangement of the shafts, the operator always has the controlling wheel directly at hand and may thereby operate the rods 17 and 18 to fully control the power, speed and the entire operation of the lathe spindle directly from the tool carriage. A pointer 46 is secured to the shaft 42 by means of a key 46ª and its movement with shaft 42 over a dial 47 secured to the bracket 41 indicates the position of the controlling mechanism.

The operation of the controlling mechanism is as follows, assuming the entire machine to be in a neutral position with the power off, the gears 10 and 11 disengaged and the brake on, as illustrated. Rotation of the hand wheel 43 in a direction to move the pointer 46 toward the mark "Slow" on the dial 47, first moves the rod 18 to the left. As the switch button 22 drops into the notch $c$ the switch is closed and the motor gives the shaft 9 a slight turn whereby the teeth of the gear 10 may be easily meshed with the teeth of the gear 12 upon a continued rotation of the hand wheel 43. This continued movement of the hand wheel 43 again opens the switch by forcing button 22 out of the notch $c$ and the pin 36 engaging in the left-hand end of the slot 36ª in the sector 32 moves the gear shifting rod 17 to the left to engage gear 10 with gear 12. Also during this last movement the inclined portion of the rod 42 at the end of the notch 25 spreads the arms 23 of the brake thereby releasing the brake from its drum and the switch is again closed by the switch button dropping into the notch $d$. It should be understood that the switch button 22 remains in the notch $c$ only momentarily and that the brake being on, the gears are moved only sufficiently to make the meshing thereof easy. It will be understood that movement of the hand wheel in the opposite or right hand direction will move the rods 17 and 18 to the right and engage the high speed gear 11, the switch button momentarily engaging in the notch $b$ and the other operations being performed in the manner above described. Movement of the hand wheel 43 from either of the "on" positions (Fig. 3) will first open the switch and directly thereafter apply the brake, the sliding gears remaining in mesh while the pin 36 is traveling the length of the slot 36ª.

What I claim is:

1. A machine control mechanism in combination with a machine having a spindle and a movable carriage, power means for operating the spindle, a change speed mechanism for varying the speed of such operation, a brake for stopping the spindle operation, means for shifting the change speed mechanism to change the speed of operation, means for controlling the brake, and a single means on the carriage for operating the last two mentioned means.

2. A machine control mechanism in combination with a machine having a movable carriage, power means for operating the machine, a change speed mechanism for varying the speed of such operation, a brake for stopping the machine, means including a longitudinally slidable rod for shifting the change speed mechanism to change the speed of operation, means including a longitudinally slidable rod for controlling the brake, and a single means on the carriage for operating the said two rods.

3. In a machine control mechanism, in combination with a machine having a movable carriage, a speed change mechanism and a brake, a rod for controlling the speed change mechanism, a rod for controlling the brake, a control shaft, two sectors on the shaft operatively connected to the rods respectively, and means on the carriage for operating the control shaft.

4. In a machine control mechanism, in combination with a machine having a speed change mechanism and a brake, a rod for controlling the speed change mechanism, a rod for controlling the brake, a control shaft, means connecting the shaft with the rods, the connection between the shaft and the change speed mechanism having a limited amount of lost motion whereby the speed change mechanism is operated only at the limits of such motion, and means for operating the shaft.

5. In a machine control mechanism, in combination with a machine having a speed change mechanism and a brake, a rod for controlling the speed change mechanism, a rod for controlling the brake, a control shaft, two sectors on the shaft operatively connected to the rods respectively, the brake rod engaging sector being tight on the shaft and the other sector having a limited rotary movement on the shaft whereby the speed change mechanism is operated only at the limits of such movement, and means for operating the shaft.

6. In a machine control mechanism, in combination with a machine having a speed change mechanism, a power control means and a brake, means acting on the speed change mechanism, the power control means and the brake to control all such elements and thereby the operation of the machine, and a single means for operating the second named means.

7. In a machine control mechanism, in combination with a machine having a speed change mechanism, a power control means and a brake, lineally sliding means acting on the speed change mechanism, the power control means and the brake to control all such elements and thereby the operation of the machine, and a single means for operating the lineally sliding means.

8. In a machine control mechanism, in combination with a machine having a speed change mechanism, a power control means and a brake, a rod for controlling the power control means and the brake, a rod for controlling the speed change mechanism, and a single means for operating both rods.

9. In a machine control mechanism, in combination with a machine having a movable carriage, a speed change mechanism, a power control means and a brake, a lineally sliding rod for controlling the power control means and the brake, a lineally sliding rod for controlling the speed change mechanism, and a single means on the carriage for controlling the operation of both rods.

10. In a machine control mechanism, in combination with a machine having a speed change mechanism, a power control means and a brake, means acting on the speed change mechanism, the power control means and the brake to control all such elements and thereby the operation of the machine, and a single means for operating the first means, movement of the single means in one direction being adapted to engage the change speed mechanism, throw off the brake and turn on the power, and movement thereof in the opposite direction being adapted to perform the reverse of such operations.

11. In a machine control mechanism, in combination with a machine having a speed change mechanism, a power control means and a brake, lineally sliding means acting on the change speed mechanism, the power control means and the brake in one direction to engage the speed change mechanism, throw off the brake and turn on the power, and operating in the opposite direction to perform the reverse of such operations, and a single means for operating the lineally sliding means.

12. In a machine control mechanism, in combination with a machine having a speed change mechanism, an electric control box for the drive motor thereof and a friction brake, a rod operatively engaging the brake and engaging a switch button extending from the control box, a rod operatively connected to the speed change mechanism, and a single means for operating both rods, movement of the single means in one direction being adapted to engage the speed change mechanism, throw off the brake and move the switch button to turn on the power, and movement thereof in the opposite direction being adapted to perform the reverse of such operations.

13. In a machine control mechanism, in combination with a machine having a speed change mechanism, an electric control box for the drive motor thereof and a brake, means acting on the speed change mechanism, control box and the brake to control all such elements, and a single means for operating the first means, movement of the single means in one direction being adapted first to momentarily close the motor switch through the control box to slightly rotate the motor and place the teeth of the speed change mechanism into a meshing position and operating directly thereafter to engage the speed change mechanism, throw off the brake and close the switch, and movement thereof in the opposite direction being adapted to perform the reverse of such operations.

14. In a machine control mechanism, in combination with a machine having a speed change mechanism, an electric control box for the drive motor thereof and a friction brake, a rod operatively engaging the brake and engaging switch means extending from the control box, a rod operatively connected to the speed change mechanism, and a single means for operating both rods, the connection between the switch means and its rod being such that movement of the single means in one direction first momentarily closes the motor switch through the control box to slightly rotate the motor and place the teeth of the speed change mechanism into a meshing position, and the continued movement of the single means operating directly thereafter to engage the speed change mechanism, throw off the brake and close the switch, and movement thereof in the opposite direction being adapted to perform the reverse of such operations.

15. In a machine control mechanism, in combination with a machine having a speed change mechanism, an electric control box for the drive motor thereof and a friction brake, a rod operatively engaging the brake and having a plurality of notches therein adapted to be successively engaged by a switch button extending from the control box, a rod operatively engaging the speed change mechanism, and a single means for operating both rods, movement of the single means in one direction permitting the said button to momentarily drop into the first notch to close the motor switch through the control box whereby to slightly rotate the motor and bring the teeth of the speed change mechanism into a meshing position, and the continued movement of the single means operating directly thereafter to engage the speed change mechanism, throw off the brake and close the switch, and movement thereof in the opposite direction being adapted to perform the reverse of such operations.

16. In a machine control mechanism, in combination with a machine having a speed change mechanism comprising two sliding gears, an electric control box for the drive motor thereof and a friction brake, a rod operatively engaging the brake and having four notches therein adapted to be successively engaged by a switch button extending from the control box, a rod operatively connected to the sliding gears, and a single means for operating both rods, movement of the single means from its central position in one direction or the other first permitting the switch button to drop into one or the other respectively of the two inside notches to momentarily close the motor switch through the control box to rotate the gears into a meshing position, and the continued movement of the single means operating directly thereafter to engage the speed change mechanism, throw off the brake and close the switch.

17. The combination in a lathe having a rotatable spindle and a movable carriage, a power driven shaft parallel with the spindle, a plurality of different sized gears slidably mounted on the shaft, means including cooperating gears providing a driving connection to the spindle, and means on the carriage operatively connected with the first named gears for shifting the same to vary the speed of the spindle.

18. The combination in a lathe having a rotatable spindle and a movable carriage, a power means for driving the spindle, a power control means for controlling the operation of the power means, a change speed mechanism driven by the power means and operatively connected to the spindle, means for controlling the change speed mechanism to vary the speed of rotation of the spindle, and means mounted on the carriage and operatively connected to the power control means and to the change speed control means for controlling both and thereby the operation and speed of the spindle.

19. The combination in a lathe having a rotatable spindle and a movable carriage, spindle controlling and operating means comprising a speed change mechanism, a power control means and a brake, and means on the carriage operatively connected with the speed change mechanism, power control means and the brake for controlling all of such elements and thereby the operation of the spindle.

20. The combination in a lathe having a rotatable spindle and a movable carriage, spindle controlling and operating means comprising a speed change mechanism, a power control means and a brake, a handle on the carriage, and means comprising a system of shafting connecting the handle with the spindle, speed change mechanism, power control means and the brake for controlling all of such elements and thereby the operation of the spindle.

21. The combination in a lathe having a rotatable spindle and a movable carriage, spindle controlling and operating means comprising a speed change mechanism, a power control means and a brake, a sliding rod for controlling the power control means and the brake, a sliding rod for controlling the speed change mechanism, and a single means on the carriage for operating both rods to control the spindle rotation.

22. The combination in a lathe having a rotatable spindle and a movable carriage, spindle controlling and operating means comprising a speed change mechanism, a power control means and a brake, and hand means on the carriage operatively connected with the speed change mechanism, power control means and the brake for controlling all of such elements and thereby the operation of the spindle, movement of the hand means in one direction being adapted to engage the speed change mechanism, throw off the brake and turn on the power, and movement thereof in the opposite direction being adapted to perform the reverse of such operations.

23. The combination in a lathe having a rotatable spindle and a movable carriage, spindle controlling and operating means comprising a speed change mechanism, a power control means and a brake, and hand means on the carriage operatively connected with the speed change mechanism, power control means and the brake for controlling all of such elements and thereby the operation of the spindle, movement of the hand means in one direction being adapted to engage the speed change mechanism at low speed, throw off the brake and turn on the power, and movement thereof in the opposite direction being adapted to engage the speed change mechanism at high speed in the same manner.

24. The combination in a lathe having a rotatable spindle and a movable carriage, spindle controlling and operating means comprising a sliding gear, speed change mechanism, a power control means and a brake, and hand means on the carriage operatively connected with the speed change mechanism, power control means and the brake for controlling all of such elements and thereby the operation of the spindle, movement of the hand means in one direction being adapted first to momentarily turn on the power to slightly rotate the gears into a meshing position and operating directly thereafter to engage the low speed gear, throw off the brake and turn on the power, and movement of the hand means in the opposite direction from its neutral position being adapted to engage the high speed gear in the same manner.

25. The combination in a lathe having a rotatable spindle and a movable carriage, a motor for driving the spindle, a mechanical change speed mechanism for varying the speed of the spindle, and means including a device on the carriage for controlling the operation of the motor and for shifting the change speed mechanism.

26. The combination in a lathe having a rotatable spindle and a movable carriage, a motor for driving the spindle, a mechanical change speed mechanism for varying the speed of the spindle, a brake for stopping the spindle rotation, and means including a device on the carriage for controlling the operation of the motor, the change speed mechanism and the brake.

In testimony whereof, I hereto affix my signature.

CLIFFORD F. RANDOLPH.